United States Patent [19]

Clawson

[11] Patent Number: 5,046,478
[45] Date of Patent: Sep. 10, 1991

[54] RECUPERATIVE FURNACE SYSTEM FOR SPACE AIR AND DOMESTIC HOT WATER

[75] Inventor: Lawrence G. Clawson, Dover, Mass.

[73] Assignee: Raytheon Company, Lexington, Mass.

[21] Appl. No.: 620,970

[22] Filed: Nov. 30, 1990

[51] Int. Cl.⁵ .............................................. F24H 3/02
[52] U.S. Cl. ................................ 126/110 R; 126/101; 126/116 R; 126/360 R
[58] Field of Search ............... 126/360 R, 360 A, 101, 126/110 R, 116 R; 122/31.1

[56] References Cited

U.S. PATENT DOCUMENTS

| | | | |
|---|---|---|---|
| 2,573,364 | 10/1951 | Scharff | 126/101 |
| 2,827,893 | 3/1958 | Ribaudo et al. | 126/101 |
| 4,069,807 | 1/1978 | Hartig | 126/360 A |
| 4,371,111 | 2/1983 | Pernosky | 126/101 |
| 4,603,681 | 8/1986 | Clawson . | |
| 4,653,466 | 3/1987 | DeHaan et al. . | |
| 4,681,085 | 7/1987 | Clawson . | |
| 4,726,353 | 2/1988 | Clawson . | |

FOREIGN PATENT DOCUMENTS 2160967  1/1986  United Kingdom ............... 126/101

*Primary Examiner*—Carroll B. Dority
*Attorney, Agent, or Firm*—William R. Clark; Richard M. Sharkansky

[57] ABSTRACT

A recuperative furnace system for space air and domestic hot water wherein a combustion product heat exchanger and a space air heat exchanger are each operated in counterflow manner. The dew point of the combustion products are elevated before entry into the combustion product heat exchanger and the water to be heated is introduced at the top at a temperature substantially below the natural dew point of the combustion products so that the fins of the heat exchanger are maintained in a substantially continuous wet state by enhanced condensation. The water thus heated is conveyed to a space air heat exchanger in counterflow to the space air so that the space air is heated to a relatively hot temperature (e.g. about 120° F.) while still cooling the water to a low enough temperature (e.g. 90° F.) so that the water can be looped back to the combustion product heat exchanger and still provide continuous wet operation. Alternately, the hot water can be diverted for domestic use and/or used to heat water in a stratified hot water tank.

31 Claims, 4 Drawing Sheets

RECUPERATIVE FURNACE SYSTEM FOR SPACE AIR AND DOMESTIC HOT WATER

BACKGROUND OF THE INVENTION

The field of the invention generally relates to furnaces having condensing or recuperative heat exchangers, and more particularly relates to heating systems that include such furnaces and also include space air heat exchangers and/or domestic hot water storage tanks.

Nonrecuperative furnaces transfer only sensible heat from the combustion products. That is, the combustion products are not cooled below their dew point before being exhausted. As a result, condensation does not take place within a nonrecuperative heat exchanger, and the process is commonly referred to as a dry process.

In contrast, recuperative furnaces not only transfer sensible heat from the combustion products, but also transfer heat of condensation as the combustion products are cooled below their dew point so that condensation takes place. As is well known, an advantage of a recuperative heat exchanger is that it generally operates at a higher efficiency because a larger percentage of the heat is extracted from the combustion products. For example, a recuperative heat exchanger may increase overall furnace efficiency to approximately 95% whereas nonrecuperative furnaces typically operate below 90% efficiency. Another advantage of a recuperative furnace is that it enables the use of inexpensive exhaust venting such as, for example, PVC pipe rather than conventional chimneys.

As is known, recuperative heat exchangers are subject to corrosive attack by acidic condensate formed therein. In combusting natural gas, and even to a greater extent fuel oil, a number of potential acid forming gases are produced. Although these gases are typically noncondensible at the operating temperatures of the recuperative heat exchanger, they are absorbed by water vapor condensate thereby forming acids. For example, carbon dioxide forms carbonic acid, nitrogen dioxide forms nitric acid, hydrogen chloride forms hydrochloric acid, and hydrogen fluoride forms hydrofluoric acid. In addition, sulfur dioxide will condense within a recuperative heat exchanger thereby forming sulfurous acid. The acidity of the condensate is further increased when water condensate evaporates leaving behind concentrated acids which corrosively attack the heat exchanger. Such concentrations typically occur at transition regions between dry and wet surfaces within the heat exchanger.

In one prior art recuperative furnace, the burner module includes a plurality of tubes that are disposed radially around the burner element. The combustion products are directed radially past the tubes and heat is transferred to a glycol mixture which is circulated through the tubes. The glycol mixture flows through a loop that includes a remote fin and tube heat exchanger that operates in a noncondensing mode. In order to extract further heat from the combustion products to provide higher efficiency, the combustion products are exhausted through a stainless steel recuperative heat exchanger that is positioned below the remote glycol heat exchanger. Space air is directed up through the recuperative heat exchanger first for preheating before being directed through the glycol heat exchanger. In addition to fabricating the recuperative heat exchanger from stainless steel to reduce corrosive attack, a flushing system directs water through the combustion products path after each burner cycle. In the event that domestic hot water is to be heated by such system, the glycol mixture is diverted through a tube coil which passes through a hot water tank. A drawback of the above-described system, however, is that it is relatively expensive to fabricate. Also, the hot water tank may be subject to deposits on the outside of the glycol conveying tube coil which interferes with the transfer of heat from the glycol mixture to the domestic water.

My U.S. Pat. No. 4,726,353 describes a recuperative furnace wherein the dew point of the combustion products is elevated before introducing them into a heat exchanger. In such manner, condensation within the heat exchanger is greatly increased, and the internal surfaces are maintained in a substantially continuous wet mode of operation. With such arrangement, the transition regions between hot and cold spots are greatly reduced or eliminated, and the temperature to which the heat exchanger is exposed is reduced. In one embodiment, a fin and tube heat exchanger is provided and the combustion products are directed across the fins while domestic hot water is channeled through the tubes. The condensate forming on the fins drains downwardly into the reservoir where it reevaporates.

SUMMARY OF THE INVENTION

In accordance with the invention, a method of heating space air comprises the steps of burning a fuel to provide combustion products, raising the dew point of the combustion products, transferring sensible heat and heat of condensation from the dew point elevated combustion products to a liquid in a tube of a first heat exchanger wherein the dew point elevated combustion products and the liquid move in opposite or counter-flow directions, conveying the liquid to a second heat exchanger and transferring heat from the liquid to space air wherein the liquid and the space air are moved in substantially opposite or counter-flow directions, and conveying the liquid so cooled by the space air in a loop back to the first heat exchanger for reheating by dew point elevated combustion products. By counterflow, it is generally meant that the exchange mediums move in substantially opposite directions. It may be preferable that the liquid exchange medium in the tube is heated in the first heat exchanger from a temperature of 100° or less to a temperature of 150° or greater by the dew point elevated combustion products. Further, it is preferable that the second heat exchanger operate in a complementary fashion such as, for example, receiving the liquid at a temperature of 150° F. or greater and cooling the liquid to a temperature of 100° or less. It may also be preferable that the method include a step of diverting the liquid exchange medium, here water, from the space air heat exchanger to a stratified water storage tank while recirculating cooler water from the bottom of the tank back to the first heat exchanger.

The invention may also be practiced by a furnace system comprising a first heat exchanger having fins surrounding a tube having an inlet disposed above a corresponding outlet, a second heat exchanger having fins surrounding a tube having an inlet and a corresponding outlet, means for recirculating water in a loop between the first and second heat exchangers wherein the water enters the respective tube inlets of the first and second heat exchangers and flows to the respective tube outlets, means for providing hot combustion products and for directing the combustion products upwardly across the fins of the first heat exchangers wherein sensible heat and heat of condensation are transferred from the combustion products to the water flowing counter thereto in a downward direction in the first heat exchanger, and means for directing space air to be heated across the fins of the second heat exchanger in counterflow to the water in the tube of the second heat exchanger wherein the space air is heated by heat transfer from the water and the water is cooled below the natural dew point of the hot combustion products. Preferably, the space air is heated to a temperature above 120° F., and more preferably at least 130° F.

With such arrangement, the recuperative heat exchanger and the space air heat exchanger operate in a complementary manner with the recuperative heat exchanger heating the water to a relatively high temperature such as, for example, 160° F. such that a relatively inexpensive space heat exchanger can be used, and the space air heat exchanger cools the water to a relatively low temperature such as, for example, 90° F. so that continuous wet operation of the recuperative heat exchanger can be maintained. By operating the space air heat exchanger in a counter-flow manner (i.e. water medium moving in opposite direction of space air), the space air can be heated to a relatively high temperature such as, for example, above 120° F. while still exiting the water at a relatively low temperature such as, for example, 90° F. so that the continuous wet operation of the combustion product heat exchanger is maintained.

Further, such arrangement may include provisions for heating domestic hot water by conveying the heated water to a hot water tank instead of the space air heat exchanger. There is no need for an intermediate heat exchange medium such as a glycol mixture, and the heated water can be channeled directly into a stratified water tank. Thus, there is no need for a heat transfer coil on which deposits can form.

BRIEF DESCRIPTION OF THE DRAWINGS

The foregoing objects and advantages will be more fully understood by reading the description of the preferred embodiment with reference to the drawings wherein.

DESCRIPTION OF THE PREFERRED EMBODIMENTS

Figure 1:
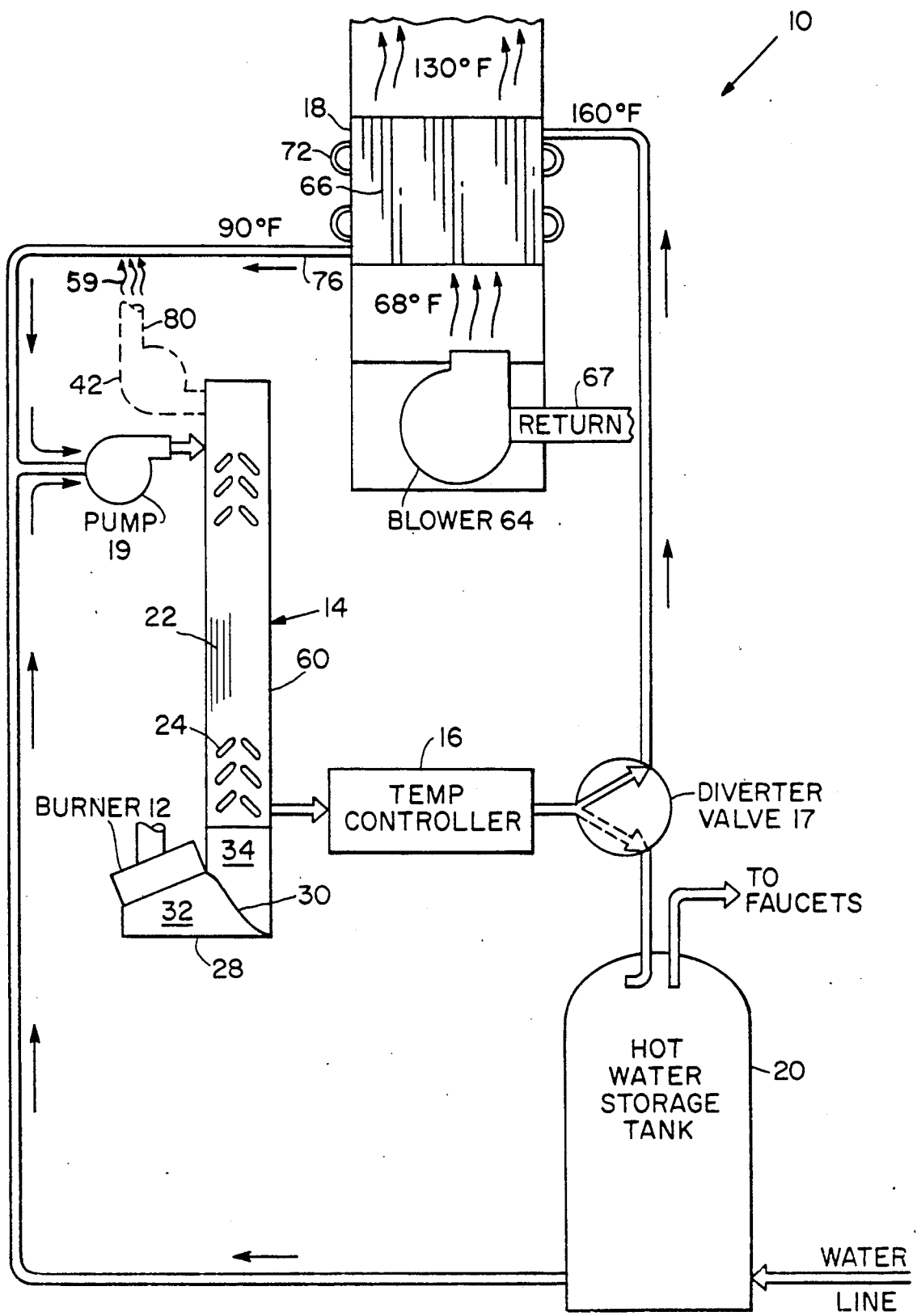
FIG. 1 is a diagrammatical view of a high efficiency furnace having a condensing heat exchanger.

Referring to FIG. 1, a space air and domestic hot water heating system 10 is shown to include a burner 12, a combustion products heat exchanger 14, a temperature controller 16, a diverter valve 17, a space air heat exchanger 18, a pump 19, and a hot water storage tank 20. As will be described in greater detail later herein, system 10 operates in alternate modes depending, among other factors, on the state of diverter valve 17. More specifically, when diverter valve 17 is in the position shown by the solid lines, hot water from combustion products heat exchanger 14 is directed through diverter valve 17 to space air heat exchanger 18 to heat return air which is then routed to heat the dwelling. The water thus cooled is then pumped by pump 19 to complete a loop back through combustion products heat exchanger 14. When diverter valve 17 is in the position shown by the dashed lines, hot water from combustion products heat exchanger 14 is either directed to a faucet or used to heat stratified hot water storage tank 20 while cold water is being drawn from the bottom of the tank 20 back through pump 19.

Figure 2:
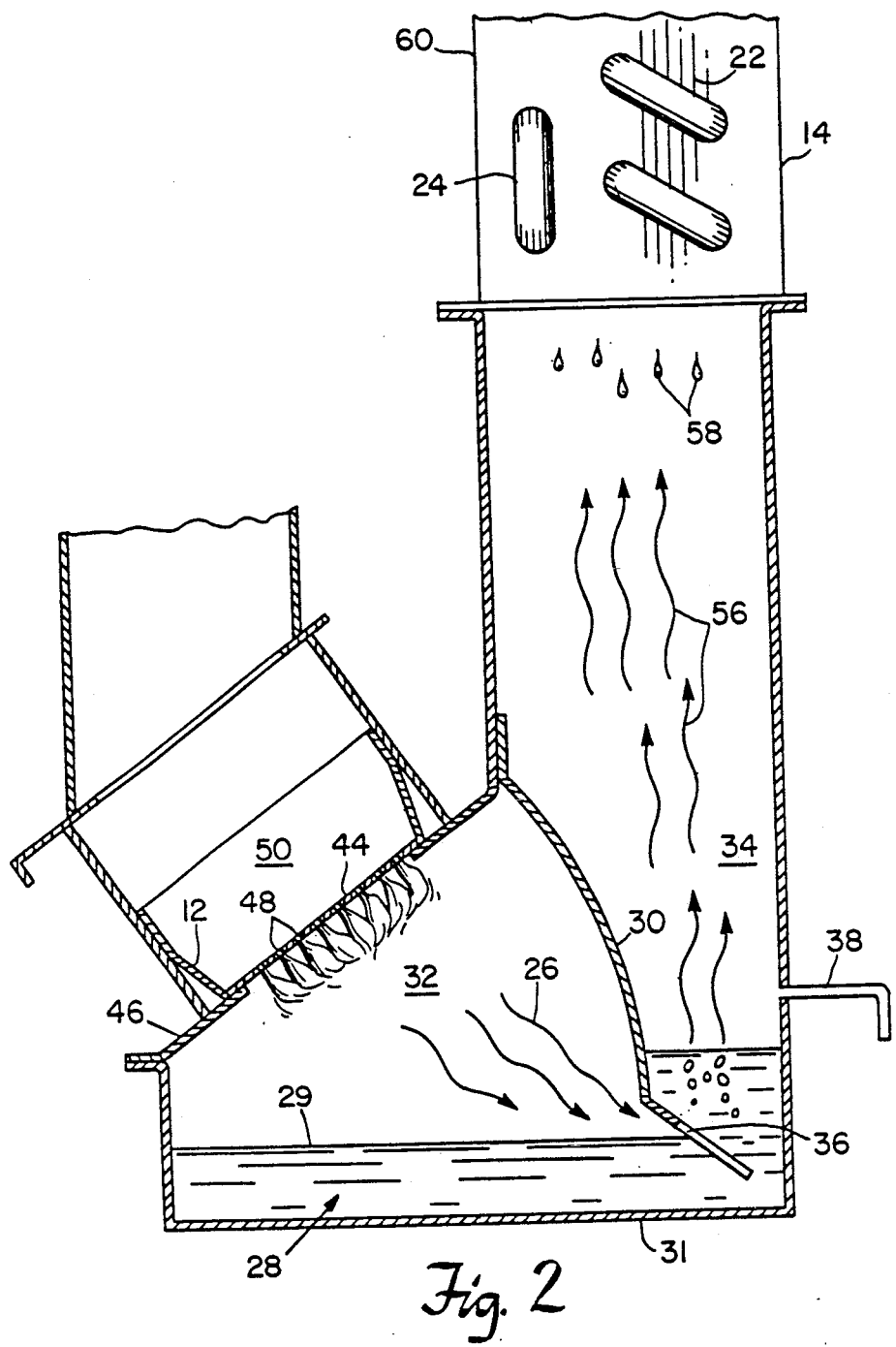
FIG. 2 is a side sectioned view of the burner and reservoir wherein the dew point of combustion products is raised by submerged combustion.

Referring to FIG. 2, combustion products heat exchanger 14 is a condensing or recuperative heat exchanger that operates in a continuous wet manner similar to that described in my U.S. Pat. No. 4,681,085 which is hereby incorporated by reference. More specifically, combustion products 26 from burner 12 are elevated in dew point before entering combustion product heat exchanger 14 so that condensing within combustion product heat exchanger 14 is greatly increased. As a result, condensate drains downwardly through the entire length of combustion product heat exchanger 14 in counter flow to the flow of combustion products, thereby keeping the flow path surfaces continuously wet. More specifically, combustion product heat exchanger 14 is a fin 22 and tube 24 heat exchanger with domestic water flowing through the tubes 24. Therefore, the fins 22 and the external surfaces of tubes 24 are maintained in a substantially continuous wet state. In addition to reducing the temperature to which the fins 22 are heated, the continuously wet operation eliminates or greatly reduces the transition regions between wet and dry areas within combustion products heat exchanger 14; these transition regions have been found to be very susceptible to corrosion.

Still referring to FIG. 2, the dew point of combustion products 26 from burner 12 is elevated by so-called submerged combustion. That is, combustion products 26 are forced or drawn down and bubbled through water 29 in reservoir 28. More specifically, reservoir 28 may typically include a tray 31 having a lateral length of approximately 20" with a partition 30 that separates reservoir 28 into a front chamber 32 and a back chamber 34. Near the bottom of partition 30 are a plurality of voids 36 that provide passageways from front chamber 32 to back chamber 34. In operation, water 29 which typically includes condensate is maintained in reservoir 28 such that voids 36 remain submerged. A positive pressure differential is provided between front chamber 32 and back chamber 34, thereby forcing or drawing the combustion products 26 from front chamber 32 through voids 36 from where they bubble up through the water 29 into back chamber 34. More specifically, the positive pressure differential causes the water level in front chamber 32 to lower and in back chamber 34 to rise thereby exposing voids 36 to provide passageways. In such manner, the combustion products 26 are significantly cooled, and the dew point is elevated or raised such as, for example, from approximately 128° F. to approximately 150° F.–160° F. Simply viewed, the elevated dew point combustion products store latent heat of vaporization that is recouped as heat of condensation in combustion products heat exchanger 14.

Figure 3A:
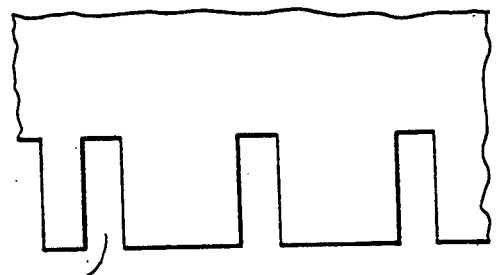
FIG. 3A is a front view of the partition in the reservoir.
Figure 3B:
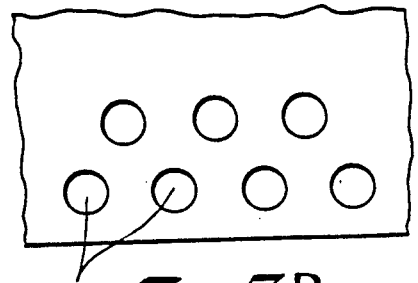
FIG. 3B is an alternate embodiment of FIG. 3A.

Referring to FIGS. 3A and 3B, alternate embodiments of voids 36 are shown. More specifically, FIG. 3A shows voids 36 to be a plurality of slots 36a such as ¼" slots that are equally spaced every ¾" along the 20"

tray. FIG. 3B shows the voids 36 to be a plurality such as, for example, 32¼" circular apertures 36b. The voids 36, whether slots 36a, circular apertures 36b, or some other suitable opening along the lateral length of partition 30 provide a stabilizing pressure drop between front chamber 32 and back chamber 34. Stated differently, they provide substantially uniform distribution of the passage of combustion products 26 along the length of partition 30. They prevent a localized break through or hot spot that could occur if a substantial portion of the combustion products 26 were permitted to pass at a single location. It is noted that the reservoir 28 should be substantially level to provide this function. There is optimum transfer of heat to water 29 and maximum raising of the dew point of combustion products 26 by using voids 36 to distribute the passage of combustion products 26 along the entire length of partition 30. The operating gap or exposed area of voids 36 may typically be approximately 1.5 in$^2$ for 80,000 Btu/hr. To increase the heating capacity, the pressure differential can be increased so as to increase the operating gap of the passageways.

Generally, a positive pressure differential between front chamber 32 and back chamber 34 can be made by either providing combustion blower 40 (FIG. 4) for burner 12, or alternatively providing blower 42 (FIG. 4) at the output of combustion products heat exchanger 14. In the former case, the burner 12 is commonly referred to as a power burner, and in the latter case, burner 12 is said to operate in an induced draft environment. One advantage of using combustion blower 40 is that it generally provides a very controlled homogeneous fuel-to-air mixture ratio whereas, with induced draft, care may have to be taken to adjust conventional fuel-to-air mixing apparatus. One disadvantage of a system 10 with combustion blower 40 is that great care has to be taken to seal all joints, and in particular within the combustion product heat exchanger 14 because otherwise combustion products could be forced out into the room; also, care must be taken to insure that combustion products do not bypass regions of the combustion product heat exchanger 14. On the other hand, these are not problem areas with induced draft apparatus wherein a negative pressure is induced in back chamber 34; the combustion products are drawn through the combustion product heat exchanger 14, and any leaks are retained within the system. Also, with induced draft, combustion products are drawn through all passageways within heat exchanger 14. In either case, when the combustion blower 40 or induced draft blower 42 is not operating, the level of water 29 in front chamber 32 and back chamber 34 would of course be the same. However, when the pressure differential is created, the pressure P1 in front chamber 32 is higher than the pressure P2 in back chamber 34 by at least approximately 1" of water, and maybe higher such as, for example, 3-4" of water. Drain 38 provides an exit for excess water 29.

As contrasted with the methods of raising the combustion product dew point as described in my U.S. Pat. No. 4,681,085, one advantage of raising the dew point by heretofore described submerged combustion is that a less expensive burner 12 can effectively be used. Here, burner 12 is a screen burner having a face plate 44 several inches high spanning the entire approximately 20" lateral width of burner box 46, and the face plate 44 has a large plurality of small holes 48 through which the gaseous fuel-air issues. Holes 48 may typically have a diameter of 0.025".

Assuming a 30% excess air/fuel mixture and input air having a 10% water vapor content as conventionally provided through a suitable mixing valve 49 (FIG. 4) or venturi, combustion products 26 are typically generated in the temperature range 2400° F.-2600° F. As is well known, one advantage of such a screen burner 12 is that the gas and air mix homogeneously within the cavity 50 before issuing through the holes 48 of the face plate 44, and therefore the air/fuel mixture burns clean without generating significant amounts of CO or hydrocarbons. The burning rate may depend on the particular household application, but screen burner 12 may typically provide 80,000 Btu/hr.-100,000 Btu/hr. As the combustion products 26 are bubbled through water 29 in reservoir 28, their temperature drops such as, for example, to 1100° F. or 1200° F., and the dew point is elevated from approximately 120° F. to the range from 150° F.-160° F. Accordingly, the dew point elevated combustion products 56 are now suitably processed by submerged combustion for entry into combustion product heat exchanger 14.

Burner 12 could alternately be a tubular burner approximately 20" long with a single or series of stamped holes or ports along the bottom. The area of these holes would preferably be approximately 4 sq.in. such that a 100,000 Btu/hr. mixture of natural gas with about 50% primary air would adhere without flashback. In operation, the blue rich flame of the burner hole, and secondary air along the two dimensional sides are drawn down into the water 29 at a velocity of about 50 ft./sec. Such combustion products 26 may typically be at a temperature of approximately 2200° F. before entry into the water 29.

Although a significant advantage of submerged combustion is that a less expensive burner 12 other than a radiant burner can be used and still effectively raise the dew point of the combustion products 26 and heat the water 29, a radiant burner could also be used. Such a radiant burner typically has two screens wherein the outer screen glows red hot and radiates substantial energy to heat the water 29. Radiant burners are large and expensive, but they generally burn cleaner and operate at a temperature of approximately 1800° F. One advantage of this lower temperature is that nitrogen oxides (NO, $NO_2$, etc.) are not found in significant quantities unless the temperature is above 2000° F., there is excess oxygen, and there is sufficient resonance time. Although more nitrogen oxides may be formed with a screen burner or tubular burner operating at a higher temperature, the combustion products 26 are nevertheless rapidly quenched at the high flow rate into the water 29, so nitrogen oxide levels with such burners are still acceptable.

Another advantage of using a submerged combustion process to elevate the dew point is that the corrosion rate of combustion product heat exchanger 14 may be slightly reduced because more of the soluble acids will be absorbed directly by the bubble through process. Accordingly, the combustion products 56 entering the combustion products heat exchanger 14 may have less acid forming components. A further advantage is that the combustion product heat exchanger 14 may be flushed with pure water by continuing to operate the blower 40 or 42 after the supply of gas is shut off at the end of a cycle. More specifically, the blower 40 or 42 would typically be run for a short period such as, for example, 30 seconds after burner 12 shuts down so as to extract thermal mass from the system 10. During this period, pure air rather than combustion products is drawn through the water 29 which remains hot. Accordingly, the pure air is saturated as it bubbles through the hot water 29, and condensation continues in the combustion product heat exchanger 14. Thus, at the end of a burner cycle, the combustion product heat exchanger 14 is flushed by pure water that condenses therein.

Figure 4:
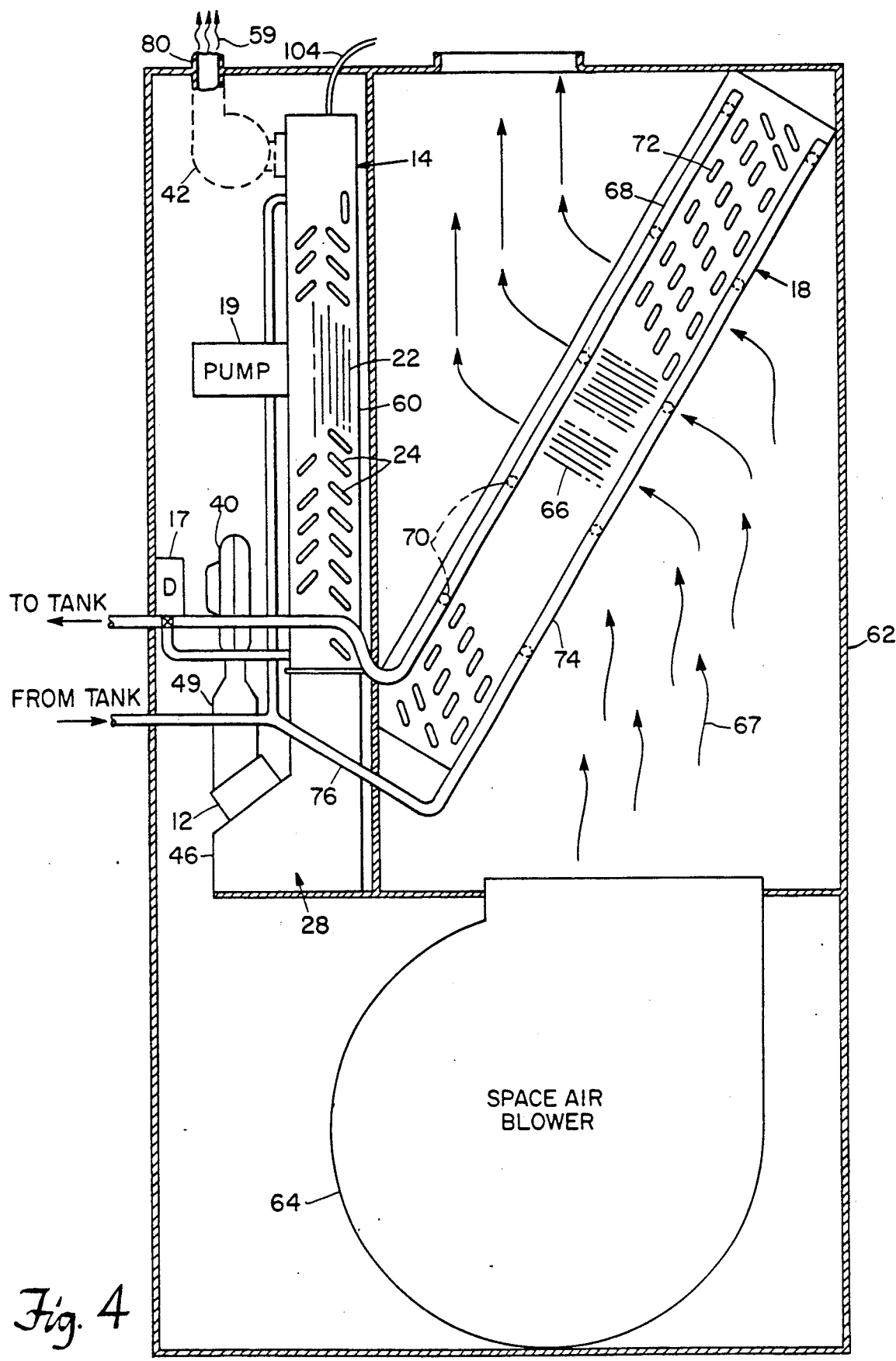
FIG. 4 is a side sectioned view of the high efficiency furnace.

Combustion product heat exchanger 14 is a fin 22 and tube 24 recuperative heat exchanger, and functions to transfer sensible heat and heat of condensation from dew point elevated combustion products 56 to domestic water that is forced through tubes 24. The combustion product heat exchanger 14 is upwardly elongated, and the combustion products 56 flow upwardly therethrough in counter flow to the domestic water that is introduced at the top of combustion product heat exchanger 14 as shown in FIGS. 1 and 4. The condensate 58 from the combustion products 56 flows downwardly in the opposite direction or counter to the flow of combustion products 56, and because the dew point of the combustion products 56 has been elevated in reservoir 28, there is sufficient condensation so as to keep the surfaces of fins 22 and the outer surfaces of tubes 24 substantially continuously wet. That is, transition regions between wet and dry surfaces that would normally be extremely susceptible to corrosion are eliminated or substantially reduced. The condensate 58 drains down into reservoir 28, and then is re-evaporated by the continuous submerged combustion bubbling process. Partition 30 is bowed outwardly in back chamber 34 as shown in FIG. 2 such that a portion of the dripping condensate 58 lands on and runs down partition 30. Such arrangement helps to limit the temperature of partition 30 which otherwise could warp or be damaged by the temperature in the burner box 46. In order to provide substantially wet surfaces for the entire height of combustion product heat exchanger 14, water in tubes 24 should be introduced into the top of combustion product heat exchanger 14 at a temperature substantially below the normal combustion product dew point such as, for example, 128° F., and preferably at a temperature below 100° F. such as, for example, 90° F. With such operation, the processed combustion products or flue gases 59 may exhaust at a relatively low temperature such as, for example, 105° F. having extracted enough heat so as to provide a system 10 with an efficiency in the mid 90% range.

As described heretofore, system 10 operates in either a space air heating mode or a domestic hot water heating mode. In the space air heating mode, it is preferable that water in tubes 24 exit the bottom of combustion product heat exchanger 14 at a relatively hot temperature such as, for example, 160° F. With such temperature, a relatively high ΔT can be provided with the space air thereby providing the desired heat transfer Q without using an unduly expensive space air heat exchanger 18 that has a large surface area A and/or unnecessarily high transfer coefficient H. Given the input water temperature of 90° F., an output temperature of 160° F., and the Btu rate to be delivered to the space air heat exchanger 18, the flow rate of water through combustion product heat exchanger 14 can readily be determined. For example, a typical flow rate may be 2.75 gallons/minute as provided by pump 19.

Combustion product heat exchanger 14 preferably satisfies a number of other conditions and parameters. First, water velocity in tubes 24 should be a minimum of 3 feet per second (fps) at outlets where the domestic water temperature is above 150° F. in order to avoid fouling or deposit generation. Second, the tube length and water velocity must be enough to yield effective counter flow heat exchange coefficients such that the tube-to-water temperature drop does not exceed about 10° F. Third, the water pressure drop which increases as the square of water velocity and linearly with the tube length should not exceed 7 pounds per square inch (psi). Fourth, fin corrosion should be such that combustion product heat exchanger 14 has a minimum life of 15 years. Finally, the water flow rate of 2.75 gallons/minute should have only small variations in order to insure counter flow effectiveness of both the combustion product heat exchanger 14 and space air heat exchanger 18. In accordance with the above described conditions and parameters, combustion product heat exchanger 14 may preferably have copper tubes 24 with an outer diameter of 0.375" and a wall thickness of 0.016". The tubes 24 may have three parallel counter flow channels of 20" length with 18 passes. The fin area of aluminum fins 22 may typically be 182 ft$^2$. The outer dimensions of combustion product heat exchanger 14 are here 18" high, 22" wide, with a thickness of 2⅜". The heat exchanger 14 is housed in a casing 60 that retains the combustion products 56.

Again referring to FIG. 1, temperature controller 16 senses the temperature of water in tubes 24 exiting combustion product heat exchanger 14, and adjusts that temperature to the set temperature by such conventional means as, for example, changing the rate of burner 12 or altering the water flow rate by controlling the pump 19 or adding restriction. Here, in the space air heating mode, approximately 160° F. hot water flows from combustion product heat exchanger 14 at a rate of 2.75 gallons/minute through temperature controller 16 and diverter valve 17 to the top of space air heat exchanger 18. As shown in FIG. 4, space air heat exchanger 18 is mounted at an incline rather than horizontal so as to limit the footprint size of cabinet 62. Here, a conventional space air blower 64 draws return air from the dwelling and forces it at approximately 1400 cubic feet per minute (cfm) through space air heat exchanger 18. Typically, the return air is at room temperature such as, for example, approximately 68° F., and is heated to approximately 125° F.-130° F. before being conveyed back to the rooms to be heated. The design parameters of the space air heat exchanger 18 are generally less stringent than the heretofore described design parameters of the combustion product heat exchanger 14. For example, the water velocity is relatively unimportant. Also, the pressure drop should not exceed 3 pounds per square inch (psi) on the water loop and the fins 66 and the fin design should be such that the 1400 cfm pressure drop is reasonable so as not to overload space air blower 64. It may be preferable to have an average counter flow temperature differential of 25° F. or less. For example, the water comes into the top of space air heat exchanger 18 at approximately 160° F. and goes out the bottom at approximately 90° F. as described heretofore. The return air 67 may come in the bottom at approximately 70° F. and go out as heated space air 69 at 130° F. Therefore, there is an exchange temperature differential at the top of 30° F. (160° F.-130° F.) and a temperature differential at the bottom of 20° F. (90° F.-70° F.)

for an average of 25° F. ((30° F.+20° F.)/2). The hot water enters a manifold 68 at the top of heat exchanger 18 and, in a somewhat arbitrary design, heat exchanger 18 has six branches 70 each leading to eight cross-counter flow passes of ⅜" copper tubes 72. Heat exchanger 18 here has exterior space air flow surface dimensions of 12"×20" with a thickness of 7". In completing the space air heating loop, the water passes through outlet manifold 74 and tube 76 through pump 19 to the top of combustion product heat exchanger 14. As described heretofore, the temperature of water entering heat exchanger 14 is preferably 90° F., and, in any event, it is substantially below 128° F. so as to maintain the continuous wet operation within heat exchanger 14. Also, such operation limits the flue gas 59 temperatures such as, for example, to 105° F. so that relatively low temperature material may be being used for the flue pipe 80. In summary, heat exchangers 14 and 18 operate complementary to each other in the space air heating mode with domestic water being recirculated between the two. Combustion products heat exchanger 14 transfers sensible heat and heat of condensation from the dew point elevated combustion products 56 to heat the recirculating water from 90° F. up to 160° F. The water in tubes 24 travels counter flow to the combustion products 56. That is, the combustion products 56 move upwardly while the water in tubes 24 moves downwardly. Heat exchanger 18 cools the water from 160° F. down to 90° F. by transferring heat to the return air 67. Heat exchanger 18 is also counter flow with the hot water travelling downwardly while the return air 67 moves upwardly.

For domestic water heating, diverter valve 17 is positioned in the dashed position as shown in FIG. 1, and pump 19 is activated so that the counter flow single pass heated water is fed into the top of hot water storage tank 20 while cooler water is being withdrawn from the bottom of storage tank 20 so that stratified layers of storage tank water move down with recharging. That is, the water at the top of hot water storage tank 20 will be at the temperature of water exiting heat exchanger 14, and the water at the bottom will be at a lower temperature. As relatively small amounts of domestic hot water are drawn, that drawn water comes from the top of the hot water storage tank by pressure from the water line. As water is drawn such that the temperature of hot water storage tank 20 drops to a predetermined temperature thereby initiating a call for more hot water, burner 12 and pump 19 are activated as will be described. If hot water continues to be drawn from a faucet, system 10 will supply that hot water and, if water is being heated at a faster rate than drawn, hot water storage tank 20 will simultaneously be recharged or heated. Typically, domestic hot water is provided at approximately 140° F., and its temperature should be adjustable according to individual preference. Further, the input temperature may vary depending on the season and operating conditions. For example, when water is brought in from the line during winter in northern climates, the water may have a temperature of, for example, 40° F. On the other hand, in the summer or when water is being withdrawn from storage tank 20 for recharging, the water may typically have a higher temperature such as, for example, 70° F. In any case, the water should be below 90° F. for the reasons described heretofore for maintaining continuous wet operation of heat exchanger 14. As described earlier, heat exchanger 14 provides a 70° F. temperature rise (90° F.-160° F.) at a flow rate of 2.75 Gpm. Accordingly, assuming a set temperature of 140° F., temperature controller 16 senses the actual temperature and may increase or decrease the flow rate of pump 19 so as to provide the set temperature. For example, temperature controller 16 may decrease the flow rate from 2.75 to 2 gallons per minute to provide a water heating temperature differential of 100° F. (40° F. to 140° F.) in the winter.

Figure 5:
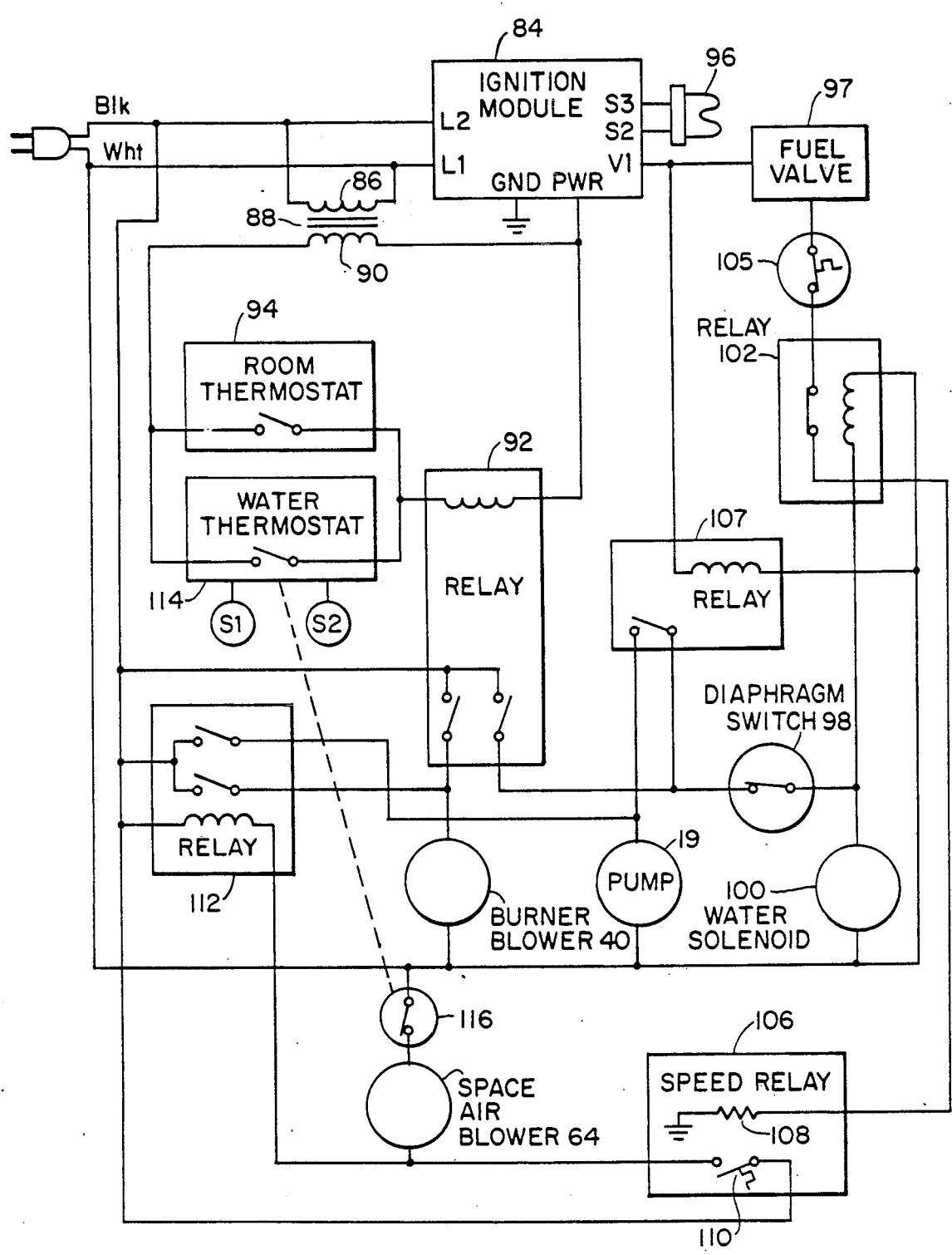
FIG. 5 is a diagram of a control system for the high efficiency furnace.

FIG. 5 shows a diagrammatical view of controller 82 for space air and domestic hot water heating system 10. 115 volt AC line voltage is connected to ignition module 84, and also to the primary winding 86 of transformer 88. The secondary winding 90 of transformer 88 is connected in a series loop with main relay 92 and room thermostat 94. The space air mode of operation of system 10 is initiated by the internal contacts of room thermostat 94 closing in response to the room falling below the set temperature. In response thereto, current is permitted to flow through and energize main relay 92. Also, the current flow through room thermostat 94 provides a control signal to PWR of ignition module 84 thereby initiating the ignition sequence. More specifically, ignition module 84 immediately energizes igniter 96 that is positioned adjacent burner 12. Accordingly, igniter 96 begins to heat up for subsequent ignition of burner 12 after ignition module 84 delays the opening of fuel valve 97 for some fixed time period such as, for example, 45 seconds. An example of an ignition module 84 is a solid state device which is commercially available from Fenwel, Inc., Division of Kidde, Inc. of Ashland, Mass., as Catalog Order No. 05-212225-107. Igniter 96 may, for example, be a commercially available Model No. 201A from Norton Company of Milford, N.H. Referring again to main relay 92 in FIG. 5, activation thereof by room thermostat 94 calling for heat energizes burner combustion blower 40 and water fill safety diaphragm switch 98 that is pneumatically coupled to front chamber 32 and back chamber 34. Diaphragm switch 98 is normally closed, and only opens when a preset pressure differential is provided between front chamber 32 and back chamber 34. Whether a burner blower 40 or an induced draft blower 42 is being used, the preset pressure differential is provided relatively quickly so long as there is sufficient water 29 in reservoir 28 to submerge partition 30 above voids 36. If there is not sufficient water 29 in reservoir 28 to achieve the pressure differential (e.g. 1" of water) and enable submerged combustion as described heretofore, diaphragm switch 98 temporarily remains closed thereby energizing water solenoid 100 and also causing the normally closed contacts of relay 102 to open. Water solenoid 100 introduces water 29 into reservoir 28 such as by directing a stream of water into inlet 104 (FIG. 4) at the top of combustion products heat exchanger 14, such water running down through heat exchanger 14 into reservoir 28. Flow of current from diaphragm switch 98 through relay 102 opens the normally closed contacts thereby disabling activation of fuel valve 97 at least until the predetermined pressure differential is achieved between front chamber 32 and back chamber 34. If there is some anomaly such that the pressure differential is never reached, the fuel valve 97 is never enabled because such operation could damage to system 10, and, in particular, to heat exchanger 14. Typically, the diaphragm switch 98 opens relatively quickly indicating a sufficient level of water 29 in reservoir 28, and proper operation of blower 40 or 42. Such opening of diaphragm switch 98 in response to proper pressure differential disables water solenoid 100 and removes the disablement of fuel valve 97 by relay 102. Accordingly, assuming that diaphragm switch opens within 45 seconds of the call-for-heat which would normally be the case, fuel valve 97 is activated by ignition module 84 after the standard delay provided by ignition module 84. Thus, after the standard delay such as 45 seconds, current energizes fuel valve 97 by flowing through normally closed temperature sensitive click switch 105, the contacts of relay 102, and speed relay switch 106 to ground. Gaseous fuel is then introduced to burner 12 and is ignited by igniter 96 which is now hot.

At the same time that ignition module 84 energizes fuel valve 97, relay 107 is energized and AC line voltage is applied to pump 19 which initiates pumping of water in a loop through heat exchangers 14 and 18. Then, after some time delay such as, for example, 20–30 seconds, resistor 108 of speed relay switch 106 heats up to a temperature whereby normally open temperature sensitive switch 110 closes thereby energizing the 1400 cfm space air blower 64 and relay 112. Space air blower 64 is delayed after energization of fuel valve 97 so that there will be instant feed warm air from space air heat exchanger 18. The function of relay 112 is to provide line voltage to burner blower 40 or 42 and pump 19 independent of relay 92. Accordingly, during shut down when thermostat 94 opens thereby deenergizing relay 92, the operation of burner blower 40 or 42, pump 19, and space air blower 64 is continued until temperature sensitive switch 110 opens after resistor 108 cools down. During this additional running time, thermal mass of the system is removed. Also, as described earlier, pure air continues to be forced or drawn through the water 29 which remains hot. Accordingly, during the delay before temperature sensitive switch 110 opens, pure water is condensed on the aluminum fins 22 of combustion product heat exchanger 14. Thus, combustion product heat exchanger 14 is flushed with pure water to resist acidic corrosion therein. Temperature sensitive click switch 105 is positioned on flue pipe 80 so as to be responsive to the temperature of flue gases 59. More specifically, temperature sensitive click switch 105 such as used conventionally in domestic clothes dryers may be set to open when a temperature such as, for example, 120° F. is reached. This temperature may be approximately 20° above the normal operation, and is indicative that the combustion product heat exchanger 14 is over-heating. Such over-heating may result for a variety of factors such as a failure of pump 19 or blower 64, or absence of water 29 in reservoir 28. In any event, temperature sensitive click switch 105 operates as a safety interlock to shut off fuel valve 97 when flue products 59 are excessively hot so as to prevent damage to the system 10, and more particularly, combustion product heat exchanger 14.

Still referring to FIG. 5, a call for domestic hot water by water thermostat 114 occurs when temperature sensor S1 which preferably is positioned approximately midlevel in stratified water storage tank 20 drops below its set point, say 120° F. Domestic hot water takes precedence over space heat so, in response thereto, water thermostat 114 causes diverter valve 17 to be in the dashed position as shown in FIG. 1, and also opens normally closed contacts 116 which disables space air blower 64. Thus, if system 10 is in the space air heating mode when a call for domestic hot water is received, the system 10 switches to domestic hot water mode deenergizing space air blower 64 and rerouting the hot water through the alternate passage of diverter valve 17. If a call for domestic hot water is received when system 10 is inactive, water thermostat 114 energizes main relay 92 and the ignition sequence starts up as described heretofore with reference to the space air mode. The hot water mode is terminated when temperature sensor S2 indicates that hot water storage tank is fully charged. For example, temperature sensor S2 is preferably located near the bottom of tank 20 and terminates the hot water mode when it reaches a temperature such as, for example, 110° F.

As described earlier, it is desirable that domestic hot water be provided at a constant temperature such as, for example, at 140° F. regardless of the water line temperature. Thus, while system 10 operates under substantially identical conditions in the space air heating mode (i.e. 90° F. water in and 160° F. out of heat exchanger 14), water thermostat 114 here activates temperature controller 16 in the hot water mode so that the speed of pump 19, for example, is adjusted to provide output water having a temperature of 140° F. Note that system 10 may switch from the space air heating mode to the domestic hot water heating mode and back again without interrupting the firing of burner 12.

This completes the description of the preferred embodiment of the invention. A reading of it by those skilled in the art will, however, bring to mind many alterations and modifications that do not depart from the spirit and scope of the invention. Accordingly, it is intended that the scope of the invention be limited only by the appended claims.

What is claimed is:

1. A method of heating space air, comprising the steps of:
   burning a fuel to provide combustion products;
   raising the dew point of said combustion products;
   transferring sensible heat and heat of condensation from said dew point elevated combustion products to a liquid in a tube of a first heat exchanger wherein said dew point elevated combustion products and said liquid move in counter-flow directions;
   conveying said liquid to a second heat exchanger and transferring heat from said liquid to space air in said second heat exchanger wherein said liquid and said space air are moved in substantially counter-flow directions; and
   conveying said liquid so cooled by said space air in said second heat exchanger in a loop back to said first heat exchanger to be reheated by dew point elevated combustion products.

2. The method recited in claim 1 wherein said liquid is heated in said first heat exchanger from a temperature of 100° F. or less to a temperature of 150° F. or greater by said dew point elevated combustion products.

3. The method recited in claim 1 wherein said liquid is cooled in said second heat exchanger from a temperature of 150° F. or greater to a temperature of 100° F. or less by said space air.

4. The method recited in claim 3 wherein said liquid is domestic water.

5. The method recited in claim 1 further comprising the step of diverting said water heated in said first heat exchanger to the top of a stratified water storage tank while water from the bottom of said tank is drawn to be heated in said first heat exchanger.

6. The method recited in claim 1 wherein said dew point is elevated by water in a reservoir and condensate drains from said first heat exchanger back into said reservoir.

7. A method of heating space air, comprising the steps of:
burning a fuel to provide combustion products;
raising the dew point of said combustion products;
passing said dew point elevated combustion products upwardly across the fins of a recuperative heat exchanger having water passing through tubes thereof so that said dew point elevated combustion products are cooled below said elevated dew point thereby resulting in said dew point elevated combustion products condensing on said fins wherein the condensate so formed drains down said fins counter to the flow of said dew point elevated combustion products maintaining said fins in a substantially continuous wet state;
conveying said water from said recuperative heat exchanger to a remote space air heat exchanger;
conveying said water through tubes in said space air heat exchanger while passing said space air across fins coupled to said tubes, said space air moving counter-flow to a direction of said water in said tubes so that said space air is heated to a temperature of 120° F. or more and said water is cooled to a temperature below said elevated dew point of said combustion products; and
conveying said water from said space air heat exchanger in a loop back to said recuperative heat exchanger to be reheated by dew point elevated combustion products.

8. The method recited in claim 7 wherein said water is heated from less than 100° F. to more than 150° F. in said recuperative heated exchanger and is complimentarily cooled from greater than 150° F. to less than 100° F. in said space air heat exchanger.

9. A furnace system comprising:
a first heat exchanger having fins surrounding a tube having an inlet disposed above a corresponding outlet;
a second heat exchanger having fins surrounding a tube having an inlet and a corresponding outlet;
means for recirculating water in a loop between said first and second heat exchangers wherein said water enters said respective tube inlets of said first and second heat exchangers and flows to said respective tube outlets;
means for providing hot combustion products and for directing said hot combustion products upwardly across said fins of said first heat exchanger wherein sensible heat and heat of condensation are transferred from said hot combustion products to said water flowing downwardly in said first heat exchanger tube;
means for directing space air to be heated across said fins of said second heat exchanger in counter-flow to said water in said tube of said second heat exchanger wherein said space air is heated by heat transfer from said water and said water is cooled below the natural dew point of said hot combustion products; and
means for raising the dew point of said hot combustion products before passing said hot combustion products across the fins of said first heat exchanger.

10. The furnace system recited in claim 9 wherein said dew point raising means is positioned to receive condensate that drips downwardly within said heat exchanger counter to the upwardly flow of combustion products.

11. The furnace system recited in claim 9 wherein said second heat exchanger comprises means for heating said space air above 120° F.

12. The furnace system recited in claim 9 wherein said first heat exchanger and said hot combustion products providing means comprise means for heating water that enters said inlet of said first heat exchanger at a temperature less than 100° F. to a temperature greater than 150° F. at said outlet of said first heat exchanger.

13. The furnace system recited in claim 9 wherein said second heat exchanger and said space air directing means comprise means for cooling water that enters said inlet of said second heat exchanger at a temperature greater than 150° F. to a temperature less than 100° F. at said outlet of said second heat exchanger.

14. A furnace system comprising:
a first heat exchanger having fins surrounding a tube having an inlet disposed above a corresponding outlet;
a second heat exchanger having fins surrounding a tube having an inlet and a corresponding outlet;
means for recirculating water in a loop between said first and second heat exchangers wherein said water enters said respective tube inlets of said first and second heat exchangers and flows to said respective tube outlets;
means for providing hot combustion products and for directing said hot combustion products upwardly across said fins of said first heat exchanger wherein sensible heat and heat of condensation are transferred from said hot combustion products to said water flowing downwardly in said first heat exchanger tube;
means for directing space air to be heated across said fins of said second heat exchanger in counter-flow to said water in said tube of said second heat exchanger wherein said space air is heated by heat transfer from said water and said water is cooled below the natural dew point of said hot combustion products;
a hot water tank and means for diverting hot water from said first heat exchanger to said hot water tank for heating domestic hot water; and
means for sensing the temperature of said water exiting said outlet of said first heat exchanger and for adjusting the flow rate of said recirculating means as a function of whether said hot water is being directed to said second heat exchanger or being diverted to said water tank.

15. A method for heating space air, comprising the steps of:
providing a first heat exchanger having fins surrounding a tube having an inlet disposed above a corresponding outlet;
providing a second heat exchanger having fins surrounding a tube having an inlet disposed above a corresponding outlet;
recirculating water in a loop between said first and second heat exchangers wherein said water enters said respective tube inlets of said first and second heat exchangers and flows in a downwardly direction to said respective tube outlets;
directing hot combustion products upwardly across said fins of said first heat exchanger so that sensible heat and heat of condensation are transferred from said combustion products to said water flowing downwardly in said first heat exchanger tube;

directing said space air upwardly across said fins of said second heat exchanger so that said space air is heated by said water in said second heat exchanger tube and said water is thereby cooled below the natural dew point of said combustion products; and raising the dew point of said combustion products before entry into said first heat exchanger thereby providing sufficient condensation within said first heat exchanger to maintain said fins in a substantially continuous wet state.

16. The method recited in claim 15 wherein condensate from said first heat exchanger drips downwardly counter to the flow of said combustion products, said condensate dripping into a reservoir used to raise said dew point of said combustion products.

17. The method recited in claim 15 wherein said water enters said inlet of said first heat exchanger at a temperature less than 100° F.

18. The method recited in claim 17 wherein said water enters said inlet of said first heat exchanger at a temperature of approximately 90° F.

19. The method recited in claim 15 wherein said space air is heated above 120° F.

20. A furnace system comprising:

a recuperative heat exchanger comprising means for transferring sensible heat and heat of condensation from combustion products to a liquid in at least one conduit wherein said combustion products and said liquid move in substantially counter-flow directions;

a space air heat exchanger comprising at least one conduit connected in a loop with said at least one conduit of said recuperative heat exchanger wherein said liquid is recirculated between said recuperative heat exchanger and said space air heat exchanger, said space air heat exchanger comprising means for transferring sensible heat from said liquid to space air wherein said space air and said liquid move in substantially counter flow directions; and means for raising the dew point of said combustion products before entry into said recuperative heat exchanger.

21. The furnace system recited in claim 20 wherein said recuperative heat exchanger comprises means for heating said liquid from a temperature less than 100° F. to a temperature greater than 150° F.

22. The furnace system recited in claim 20 wherein said space air heat exchanger comprises means for cooling said liquid from a temperature greater than 150° F. to a temperature less than 100° F.

23. The furnace system recited in claim 20 wherein said space air heat exchanger comprises means for heating said space air above 120° F.

24. The furnace system recited in claim 20 wherein condensate from condensation within said recuperative heat exchanger runs downwardly in the opposite direction of said combustion products, and drains into said dew point raising means.

25. The furnace system recited in claim 20 wherein said recuperative heat exchanger is a fin and tube heat exchanger.

26. The furnace system recited in claim 20 wherein said space air heat exchanger is a fin and tube heat exchanger.

27. The furnace system recited in claim 20 further comprising a hot water storage tank and means for diverting hot water from said recuperative heat exchanger to said hot water tank.

28. The furnace system recited in claim 27 further comprising means for recirculating water from the bottom of said hot water tank to the top of said recuperative heat exchanger.

29. A method of heating space air, comprising the steps of:

providing a recuperative heat exchanger having fins surrounding a tube which has an inlet to said heat exchanger that is located above a corresponding outlet;

providing a space air heat exchanger having fins surrounding a tube which has an inlet and a corresponding outlet;

recirculating water in a loop between said recuperative heat exchanger and said space air heat exchanger, said water entering said respective inlets of said tubes and flowing to said respective outlets;

locating a water reservoir below said recuperative heat exchanger;

contacting hot combustion gases with said water in said reservoir to elevate the dew point and lower the temperature of said hot combustion gases;

directing said dew point elevated combustion gases upwardly across said recuperative heat exchanger in counterflow to said water in said tube of said recuperative heat exchanger, said dew point elevated combustion gases being provided at a given dew point and temperature where said liquid in said tube within said recuperative heat exchanger cools said combustion gases such that a substantial majority of the water vapor in said combustion gases condenses on said recuperative heat exchanger wherein a steady state cycle of condensation and evaporation is maintained where condensate flows back downward said fins in said recuperative heat exchanger into said reservoir at the same time said hot combustion gases reevaporate water in said reservoir for subsequent condensing on said heat exchanger; and directing a flow of space air across said fins in said space air heat exchanger in counter-flow to said water in said tube of said space air heat exchanger to heat said space air and cool said liquid to a temperature substantially below the natural dew point of said combustion products.

30. The furnace system recited in claim 25 wherein fins of said fin and tube heat exchanger comprise aluminum.

31. The furnace system recited in claim 25 wherein a tube of said fin and tube heat exchanger comprises copper.

* * * * *